United States Patent

[11] 3,588,800

| [72] | Inventors | Edward J. Moore;<br>Kantilal P. Desai, Tulsa, Okla. |
|---|---|---|
| [21] | Appl. No. | 718,540 |
| [22] | Filed | Apr. 3, 1968 |
| [45] | Patented | June 28, 1971 |
| [73] | Assignee | Atlantic Richfield Company<br>New York, N.Y. |

[54] METHOD OF DETERMINING CHARACTERISTICS OF EARTH FORMATIONS
7 Claims, 8 Drawing Figs.

| [52] | U.S. Cl. | 340/15.5 |
|---|---|---|
| [51] | Int. Cl. | G01v 1/00 |
| [50] | Field of Search | 340/15.5<br>(CF); 73/69 |

[56]        References Cited
        UNITED STATES PATENTS

| 3,072,907 | 1/1963 | Boucher | 340/15.5 |
|---|---|---|---|
| 3,292,143 | 12/1966 | Russell | 340/15.5 |
| 2,963,641 | 12/1960 | Nanz | 181/0.5 |
| 3,251,221 | 5/1966 | Vogel et al. | 181/0.5 |

Primary Examiner—Rodney D. Bennett, Jr.
Assistant Examiner—Joseph G. Baxter
Attorney—McLean, Morton and Boustead ABSTRACT: A method of and apparatus for determining characteristics of earth formations. A pulse of acoustic energy is passed from an electroacoustic transmitter, through the earth formation, to an electroacoustic receiver. The received signal is applied to a spectrum analyzer which produces a spectrum indicative of the amplitudes of the different frequency components within the received signal. This frequency spectrum can be recorded for further analysis.

INVENTORS.
EDWARD J. MOORE
KANTILAL P. DESAI

BY McLean, Morton, & Boustead

ATTORNEYS.

INVENTORS.
EDWARD J. MOORE
KANTILAL P. DESAI

BY McLean, Morton & Boustead

ATTORNEYS.

METHOD OF DETERMINING CHARACTERISTICS OF EARTH FORMATIONS

This invention relates to a method of and apparatus for exploring the earth for geophysical formations. More particularly, this invention relates to a method of and apparatus for analyzing the attenuation characteristics of earth formations to provide information about the elastic properties of such formations so that the physical nature of the formations can be determined.

The recording of the acoustic waveform received during acoustic well logging is a well known and commercial method of detecting earth formations of interest beneath the surface of the earth. The waveform might be recorded either in a continuous wave train or in discrete sections. Heretofore, such recording of acoustic waveforms has been limited to the recording of the full acoustic wave train received by the well logging tool. While it is possible to obtain considerable information regarding underground formations from analysis of the recorded full acoustic wave train, only limited reliability can be placed on the results of such analysis, and highly trained personnel are required to do the analysis.

Another method used to obtain information concerning underground earth formations is the use of acoustic well logging tools having two displaced receivers. The maximum signal amplitude at each receiver or, alternatively, the amplitude of the first signal received at each receiver is compared. While this technique provides information concerning the underground earth formations, it can be misleading when signals of the same frequency arrive at the receivers from different directions and in different phases.

In accordance with the present invention, the wave train received by an acoustic well logging tool is passed through a spectrum analyzer, and the output of that spectrum analyzer is recorded to provide a frequency spectrum of the received signal. It has been found that the amount of attenuation of frequencies within that signal is dependent upon the characteristics of the earth formation through which the signal passes. Accordingly, by analyzing the frequency spectrum of the detected acoustic wave train, improved information about the underground earth formation is obtained. A sample of the earth formation from the region of interest can first be tested under laboratory conditions to determine the frequency spectra which are to be expected for different geophysical properties. This laboratory analysis then provides a basis for comparison of the results obtained in the field within that region of interest.

The frequency or spectrum analysis which is performed on the detected acoustic wave train might, for example, comprise separation and amplitude measurement of the various frequency components of the wave train to determine the fundamental and harmonic frequencies and intermodulation products. Such an analysis can be performed by, for example, a Hewlett Packard model 310 frequency analyzer. It has been found that as the density of entrained liquids within a sample of earth formation decreases, the attenuation of the wave train also decreases, with the result that the amplitude of the wave train increases. Likewise a decrease in the porosity of the earth sample results in a decrease in attenuation. Similarly, as the permeability of the sample decreases, the attenuation decreases, and the wave train amplitude increases. Thus, it has been found that by obtaining a record of the signal amplitude as a function of frequency, it is possible to determine not only characteristics of the rock within the earth formation, but also whether fluids of interest are present within the rock formation and the type of fluid therein.

These and other aspects and advantages of the present invention are apparent in the following detailed description and claims, particularly when read in conjunction with the accompanying drawings in which like parts bear like reference numerals.

Figure 4A:
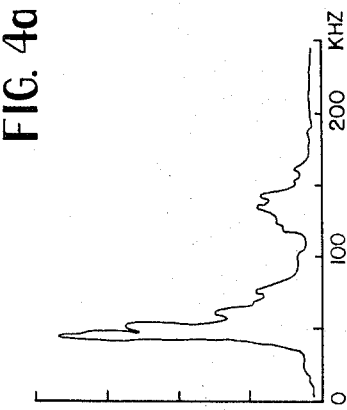
Figure 4B:
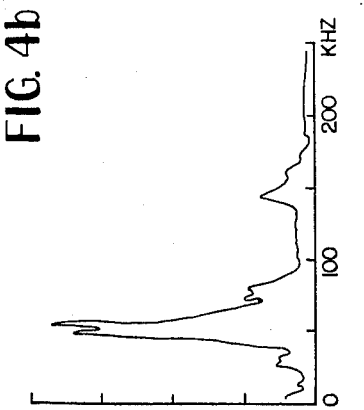
Figure 4C:
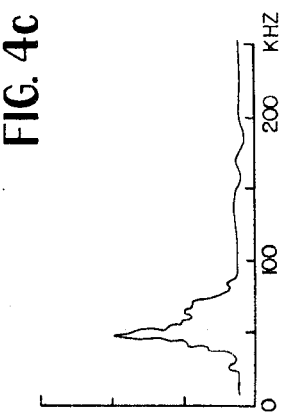
Figure 3A:
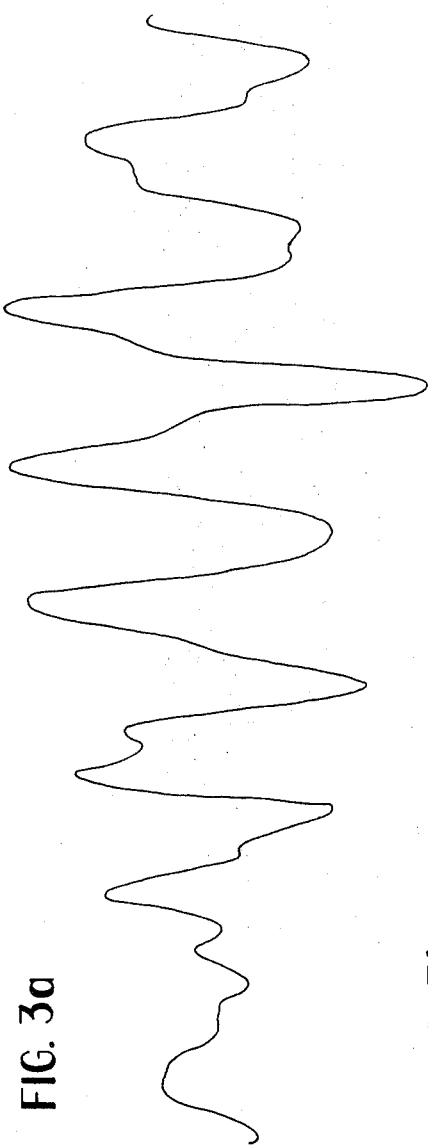
Figure 3B:
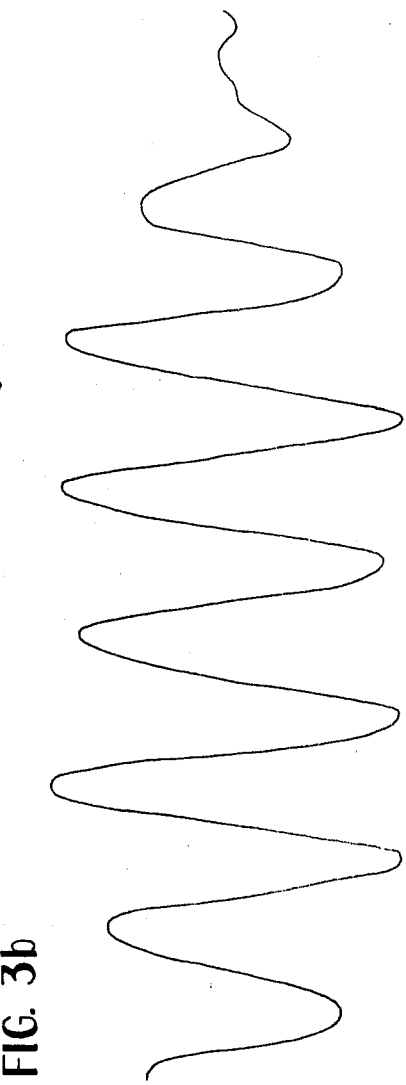
Figure 3C:
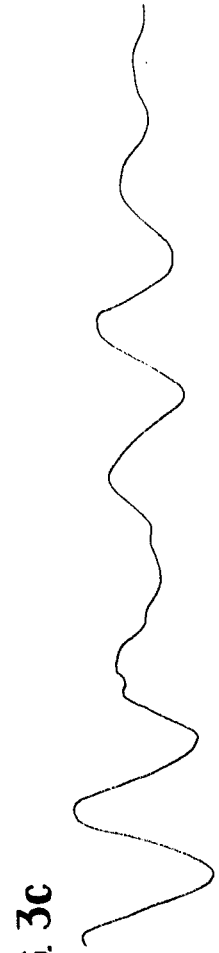

FIGS. 3A, 3B, and 3C depict wave trains of signals received by an acoustic well logging tool in earth formations different characteristics; and FIGS. 4A, 4B, and 4C depict the frequency spectra of the corresponding received wave trains of FIG. 3.

Figure 1:
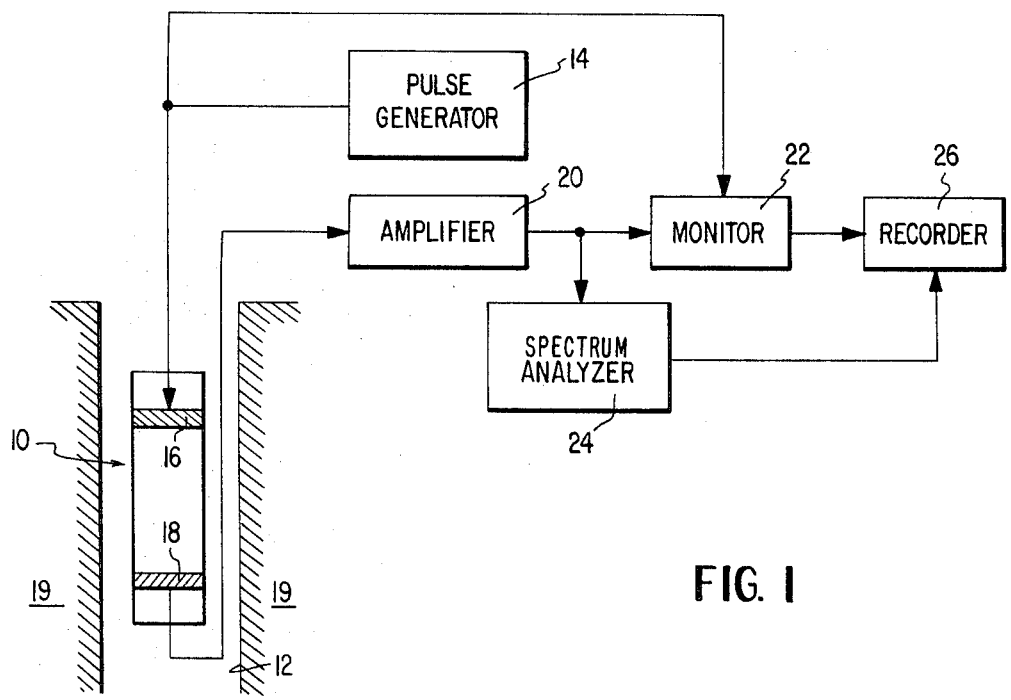
FIG. 1 is a block diagram of the apparatus of the present invention utilized in conjunction with an acoustic well logging tool.

In the embodiment of the apparatus of the invention depicted in FIG. 1, acoustic well logging tool 10, located within well bore 12, transmits a pulse of acoustic energy each time an electrical pulse is applied to logging tool 10 from pulse generator 14. The pulse from electroacoustic transmitter 16 within logging tool 10 travels by two paths to electroacoustic receiver 18, at the opposite end of logging tool 10. A portion of the acoustic energy is transmitted through the earth formation 19 to receiver 18. A second portion of the acoustic energy travels through the fluid within well bore 12 surrounding logging tool 10. The speed of transmission through the earth formation 19 is generally greater than is the speed of the transmission through the fluid. Consequently, the acoustic energy traveling through the earth formation 19 reaches receiver 18 before the acoustic energy which travels through the fluid. Receiver 18 converts this received acoustic energy into an electrical signal which is applied through amplifier 20 to display monitor 22.

Pulse generator 14 also applies a signal to monitor 22 at the time the electrical pulse is applied to transmitting transducer 16. The signal applied to monitor 22 from pulse generator 14 establishes a time reference and an amplitude reference. The signal received by receiver 18 then can be analyzed for transmission time and signal attenuation by comparison with this reference signal.

The signal from receiver 18 is also applied by amplifier 20 to spectrum analyzer 24. The resulting frequency spectrum is transmitted from frequency analyzer 24 to recorder 26 which provides a visible indication of the frequency spectrum. If desired, the signal directly applied to monitor 22 can also be recorded by recorder 26.

While FIG. 1 depicts well logging tool 10 with a single acoustic transmitter 16 and a single acoustic receiver 18, a standard well logging tool might be utilized, having two or more acoustic receivers. The signal received at each receiver could be analyzed. In addition, well logging tool 10 could be inserted into the well bore 12 with transmitter 16 below receiver 18.

Figure 2:
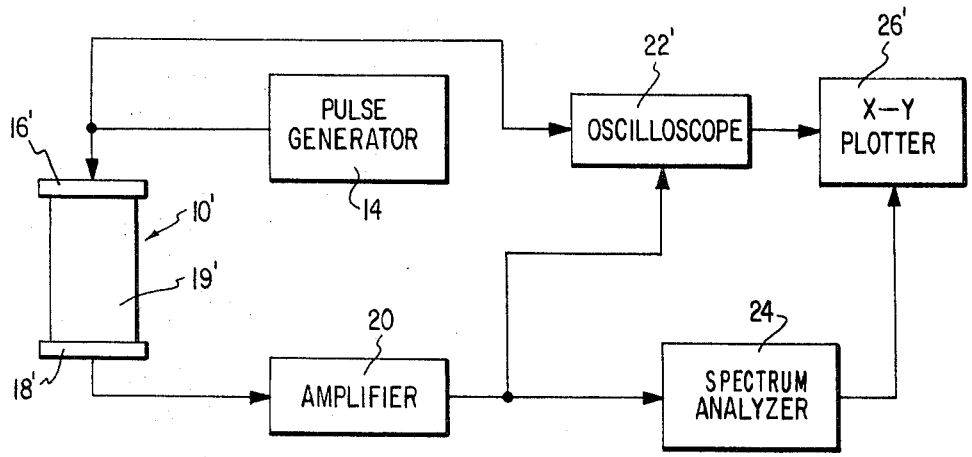
FIG. 2 is a block diagram of the apparatus of the present invention utilized in conjunction with laboratory apparatus for determining frequency characteristics of a sample of earth formation.

FIG. 2 depicts an embodiment of the present invention suitable for use during laboratory analysis of samples of the earth formation. The acoustic sounding apparatus 10' includes transmitter 16' and receiver 18' in intimate contact with the two ends of sample 19' of earth formation. When pulse generator 14 applies a signal to transmitter 16', the transmitter causes a pulse of acoustic energy to be transmitted through sample 19'. When this acoustic energy reaches receiver 18' it is converted to electrical energy which is applied to amplifier 20. The electrical pulse from pulse generator 14 is applied to cathode ray oscilloscope 22' which displays the receiver signal from amplifier 20. The received signal is also applied by amplifier 20 to spectrum analyzer 24 which has its output connected to a graphical recorder such as XY plotter 26'. Thus XY plotter 26' produces a permanent record of the frequency spectrum of the received signal. In addition, if desired, a record of the signal shown on oscilloscope 22' can be recorded by XY plotter 26'. By way of example, acoustic sounding apparatus 10' could be the apparatus disclosed and claimed in copending U.S. Pat. application Ser. No. 691,748, filed Dec. 19, 1967, by K. P. Desai and E.J. Moor in which the pressures on the sample 19' can be varied to simulate in situ conditions.

FIG. 3A depicts the recorded wave train from an acoustic well logging apparatus transmitting signals through dry earth formation. Such a wave train is received as the output of amplifier 20. FIG. 3B depicts a similar wave train for a sample of oil-bearing earth formation. Likewise, FIG. 3C depicts a similar wave train for a sample of earth formation saturated with sodium chloride solution. The input signal utilized in each instance (FIGS. 3A, 3B, and 3C) was substantially identical. In addition, the earth formation in each instance was substantially the same as to material, porosity, and permeability. From a comparison of FIGS. 3A 3B, it is apparent that is it difficult to distinguish the wave train of the dry earth formation from the wave train of the oil-bearing earth formation. While the dry earth formation wave train appears to include some harmonics of the fundamental frequency not all of the waves include such harmonics. The fundamental frequency and signal amplitude are substantially the same for both the dry wave train and the oil-bearing wave train. The wave train of the earth formation saturated with sodium chloride solution also has substantially the same fundamental frequency, although its amplitude is somewhat attenuated. While operating under field conditions this attenuation might be influenced by other factors not related to the earth formation characteristics, for example by a logging tool decentralized in the well bore. Thus, it is not possible to base analysis of the earth formation solely upon the amplitude of the received wave train.

FIG. 4A depicts the frequency spectrum of the wave train of an acoustic signal passed through dry earth formation. This frequency spectrum results from passing the output of amplifier 20 through spectrum analyzer 24. Similarly, FIG. 4B depicts the frequency spectrum of the wave train of the signal passed through oil-bearing earth formation, and FIG. 4C depicts the frequency spectrum of the wave train of the acoustic signal passed through earth formation saturated with sodium chloride solution. From FIG. 4A it can be observed that the frequency spectrum of the wave train of the signal passed through a dry earth formation reaches a sharp peak at frequency in the order of 45 kilohertz and then drops in sharp but pronounced steps, reaching a minimum at a frequency in the order of 110 kilohertz. The frequency spectrum then increases, reaching a second peak, substantially lower than the first peak, at a frequency in the order of 130 kilohertz. From there the frequency spectrum again decays and levels off after reaching a frequency in the order of 190 kilohertz.

By comparison, the frequency spectrum of the acoustic wave train passed through oil-bearing earth formation (FIG. 4B) rises sharply but does not reach its peak until it has reached frequency in the order of 55 kilohertz. From there the wave train drops sharply, reaching a minimum at a frequency in the order of 90 kilohertz. The frequency spectrum then remains substantially flat until a frequency in the order of 130 kilohertz is reached, at which point the spectrum rises, reaching a second peak at a frequency in the order of 140 kilohertz. This second peak is substantially lower than the first peak. After the second peak, the frequency spectrum again drops, leveling off after a frequency in the order of 190 kilohertz. The frequency spectrum of the wave train passed through earth formation saturated with sodium chloride solution (shown in FIG. 4C) rises sharply from a point at a frequency in the order of 35 kilohertz and reaches a peak at a frequency in the order of 45 kilohertz. From there the spectrum drops sharply in steps until a frequency of approximately 85 kilohertz is reached and then the spectrum drops gradually, finally leveling off at a frequency in the order of 190 kilohertz. There is no second sharp peak in this frequency spectrum.

Thus, it is seen that the frequency spectrum of the waveform passed through each different type of earth formation has unique characteristics. The characteristics to be expected from a particular type of earth formation are first determined by empirical means, for example, by conducting tests on samples of the earth formation with the apparatus of FIG. 2. Then the apparatus of FIG. 1 is utilized in a conventional well logging operation. The received acoustic signals which have passed through the earth formation of interest are applied to spectrum analyzer 24 to provide a frequency spectrum which is recorded by recorder 26. The resulting frequency spectrum is then compared with the results of the laboratory tests conducted with the apparatus of FIG. 2. Based on this comparison it is possible to determine whether the earth formation contains minerals of interest, for example, oil.

Although the present invention has been described with reference to preferred embodiments, numerous modifications and changes could be made and still the result would be within the scope of the invention.

We claim:

1. A method of determining characteristics of earth formations comprising transmitting through an earth formation a pulse of acoustic energy including at least one energy frequency; receiving the acoustic energy after passage through the earth formation; determining the spectrum analysis of the received acoustic energy over a frequency range including said one frequency; and comparing the spectrum analysis of the received acoustic energy with the spectrum analysis of other acoustic energy having an acoustic frequency spectrum indicative of known earth formation characteristics.

2. A method as claimed in claim 1 in which the transmitting is accomplished by applying an electrical pulse to an electroacoustic transducer in contact with the earth formation and in which the receiving is accomplished by an electroacoustic transducer.

3. A method as claimed in claim 1 further comprising displaying said spectrum analysis.

4. A method as claimed in claim 3 further comprising displaying said received acoustic energy.

5. A method of exploration for petroleum deposits within a prospect area which comprises obtaining a sample of earth formation from the prospect area; transmitting through said sample a first pulse of acoustic energy including at least one energy frequency; receiving the first pulse acoustic energy after passage through said sample; determining the spectrum analysis of the received first pulse acoustic energy over a frequency range including said one frequency; transmitting through a zone of said prospect area a second pulse of acoustic energy including at least said one energy frequency; receiving the second pulse acoustic energy after passage through the zone; determining the spectrum analysis of the received second pulse acoustic energy over said frequency range; and comparing the received second pulse spectrum analysis with the received first pulse spectrum analysis to determine the degree of similarity of the earth formation characteristics of the sample and of the zone.

6. A method as claimed in claim 5 further comprising recording the first pulse spectrum analysis and the second pulse acoustic energy spectrum analysis.

7. A method as claimed in claim 5 in which the first pulse is transmitted by an electroacoustic transducer in contact with said sample and is received by an electroacoustic transducer and in which the second pulse is transmitted by an electroacoustic transducer in pulse-transmitting relation with said prospect area and is received by an electroacoustic transducer in pulse receiving relation with said prospect area.